US012327673B2

(12) United States Patent
Luo et al.

(10) Patent No.: US 12,327,673 B2

(45) Date of Patent: Jun. 10, 2025

(54) INDUCTOR APPARATUS

(71) Applicant: REALTEK SEMICONDUCTOR CORPORATION, Hsinchu (TW)

(72) Inventors: Cheng-Wei Luo, Hsinchu (TW); Chieh-Pin Chang, Hsinchu (TW); Kai-Yi Huang, Hsinchu (TW); Ta-Hsun Yeh, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 808 days.

(21) Appl. No.: 17/551,209

(22) Filed: Dec. 15, 2021

(65) Prior Publication Data

US 2022/0208437 A1 Jun. 30, 2022

(30) Foreign Application Priority Data

Dec. 29, 2020 (TW) ................................ 109146708

(51) Int. Cl.
*H01F 27/29* (2006.01)

(52) U.S. Cl.
CPC .................................... *H01F 27/29* (2013.01)

(58) Field of Classification Search
CPC ................. H01F 27/29; H01F 17/0006; H01F 2017/0073
USPC ........................... 336/83, 107, 192, 200, 232
See application file for complete search history.

(56) References Cited

U.S. PATENT DOCUMENTS

| | | | | |
|---|---|---|---|---|
| 9,196,409 | B2 | 11/2015 | Nazarian | |
| 2015/0065068 | A1* | 3/2015 | Mattsson | H01F 27/2804 336/200 |
| 2019/0279809 | A1* | 9/2019 | Yen | H01F 17/0006 |
| 2020/0312521 | A1* | 10/2020 | Yen | H01F 27/2804 |
| 2021/0065966 | A1* | 3/2021 | Yen | H01F 17/0006 |

FOREIGN PATENT DOCUMENTS

| | | | |
|---|---|---|---|
| WO | WO 2005096328 | A1 | 10/2005 |
| WO | WO 2009101565 | A1 | 8/2009 |

* cited by examiner

*Primary Examiner* — Tuyen T Nguyen

(74) *Attorney, Agent, or Firm* — WPAT, PC

(57) ABSTRACT

The present invention discloses an inductor apparatus. Each of a first section of a second and a fourth quadrant loops are bridged to a first section of a former quadrant loop and are bridged to a third section to a second section of a diagonal quadrant loop. Each of a second section of the second and the fourth quadrant loops are coupled to a third section of the diagonal quadrant loop, and to the second section of a former quadrant loop. A first section of a third quadrant loop is coupled to a first section of the fourth quadrant loop, and to a third section of the first quadrant loop. The second section of the third quadrant loop is coupled to a second section of the fourth quadrant loop and to a third section of the third quadrant loop, and to a third section of the first quadrant loop.

10 Claims, 4 Drawing Sheets

100

100

INDUCTOR APPARATUS

BACKGROUND OF THE INVENTION

1. Field of the Invention

The present invention relates to an inductor apparatus.

2. Description of Related Art

Inductors are electronic devices that operate based on electromagnetic induction. When a current flows through a wire, an electromagnetic field is generated around the wire. The electromagnetic field generated by the wire may induct other wires within the electromagnetic field. Usually, the wire is winded to form a coil to enhance the magnetic field inside of the coil to form the inductor apparatus in circuits.

However, the formation of the coil may affect the complexity and the efficiency of the inductor apparatus. The material of line sections used to perform bridging is different from the material of the wires and has higher impedance. When the wiring method of the coil is not designed well, the number of the line sections used to perform bridging may increase along with the increase of the number of the coil loops. Not only the complexity of the wiring of the inductor apparatus increases, the increase of the impedance also impacts the efficiency thereof.

SUMMARY OF THE INVENTION

In consideration of the problem of the prior art, an object of the present invention is to provide a signal enhancement relay apparatus and a signal enhancement relay method.

The present invention discloses an inductor apparatus that includes four coil loops, a plurality of centrally bridging line sections and a plurality of laterally bridging line sections. The four coil loops are arranged in an order of a clockwise manner and includes a first quadrant coil loop, a second quadrant coil loop, a third quadrant coil loop and a fourth quadrant coil loop. The first quadrant coil loop includes a first section, a second section and a third section, wherein the first section thereof is directly coupled to a first I/O terminal, and the second section thereof is directly coupled to a second I/O terminal Each of the second quadrant coil loop and the fourth quadrant coil loop includes a first section, a second section and a third section, wherein the first section thereof is centrally bridged over a central area of the four coil loops to the first section of a former quadrant coil loop, and the first section thereof is also laterally bridged over the second section to the third section thereof such that the third section thereof is further directly coupled to the second section of a diagonal quadrant coil loop through the central area, and the second section thereof is directly coupled to the third section of the diagonal quadrant coil loop, and the second section thereof is also directly coupled to the second section of the former quadrant coil loop through the central area. The third quadrant coil loop includes a first section, a second section and a third section, wherein the first section thereof is centrally bridged over the central area to the first section of the fourth quadrant coil loop and the first section thereof is also centrally bridged over the central area to the third section of the first quadrant coil loop, the second section thereof is directly coupled to the second section of the fourth quadrant coil loop through the central area and the second section thereof is also laterally bridged over the first section thereof to the third section of the third quadrant coil loop such that the third section of the third quadrant coil loop is further centrally bridged over the central area to the third section of the first quadrant coil loop. The centrally bridging line sections and the laterally bridging line sections are configured to perform central coupling and lateral bridging.

The present invention also discloses an inductor apparatus that includes four coil loops and a plurality of centrally bridging line sections. The four coil loops are arranged in an order of a clockwise manner and includes a first quadrant coil loop, a second quadrant coil loop, a third quadrant coil loop and a fourth quadrant coil loop. The first quadrant coil loop includes a first section and a second section, wherein the first section thereof is directly coupled to a first I/O terminal and the second section thereof is directly coupled to a second I/O terminal. The second quadrant coil loop includes a first section directly coupled to the second section of the first quadrant coil loop over a central area of the four coil loops. The third quadrant coil loop includes a first section centrally bridged to the first section of the first quadrant coil loop over the central area. The fourth quadrant coil loop includes a first section directly coupled to the first section of the second quadrant coil loop through central area and centrally bridged to the first section of the third quadrant coil loop over the central area. The centrally bridging line sections are configured to perform central coupling.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an inductor apparatus to keep the number of the centrally bridging line sections and the laterally bridging line sections unchanged, by using the disposition method of the first section, the second section and the third section of each of the quadrant coil loops, without being affected by the number of the circles of each of the quadrant coil loops. The design of the inductor coil can be simplified and the efficiency thereof can be improved.

Figure 1:
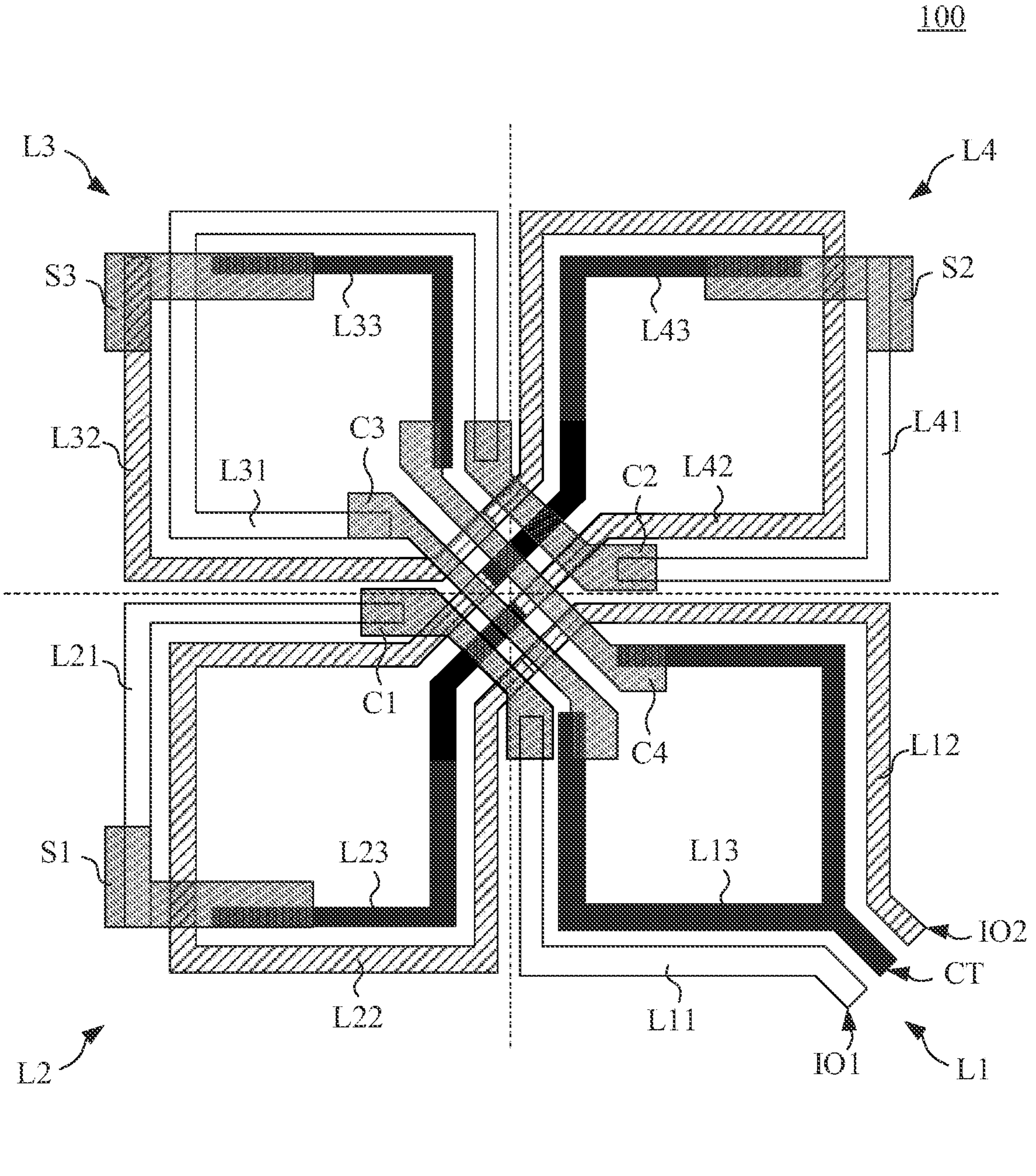
FIG. 1 illustrates a circuit diagram of an inductor apparatus according to an embodiment of the present invention.

Reference is now made to FIG. 1. FIG. 1 illustrates a diagram of an inductor apparatus 100 according to an embodiment of the present invention. The inductor apparatus includes four coil loops L1~L4, a plurality of centrally bridging line sections C1~C4 and a plurality of laterally bridging line sections S1~S3.

The four coil loops L1~L4 are arranged in an order of a clockwise manner and includes a first quadrant coil loop L1, a second quadrant coil loop L2, a third quadrant coil loop L3 and a fourth quadrant coil loop L4. According to the arrangement relation of any one of the quadrant coil loop with the other three quadrant coil loops, each of the quadrant coil loops has a former quadrant coil loop, a latter quadrant coil loop and a diagonal quadrant coil loop disposed nearby.

Take the first quadrant coil loop L1 as an example, the former quadrant coil loop is the fourth quadrant coil loop L4, the latter quadrant coil loop is the second quadrant coil loop L2 and the diagonal quadrant coil loop is the third quadrant coil loop L3. Each of the rest of the three quadrant coil loops has an identical relation with other quadrant coil loops and is not further described herein.

Each of the coil loop L1~L4 has three sections. More specifically, the first quadrant coil loop L1 includes a first section L11, a second section L12 and a third section L13. The second quadrant coil loop L2 includes first section L21, a second section L22 and a third section L23. The third quadrant coil loop L3 includes a first section L31, a second section L32 and a third section L33. The fourth quadrant coil loop L4 includes a first section L41, a second section L42 and a third section L43. The first sections L11, L21, L31 and L41 are illustrated as white blocks. The second sections L12, L22, L32 and L42 are illustrated as blocks with slash lines. The third sections L13, L23, L33 and L43 are illustrated as black blocks.

In the first quadrant coil loop L1, the first section L11 thereof is directly coupled to a first I/O terminal IO1, and the second section L12 thereof is directly coupled to a second I/O terminal IO2. In an embodiment, the third section L13 includes a central tap CT.

In the second quadrant coil loop L2, the first section L21 thereof is centrally bridged over a central area of the four coil loops L1~L4 to the first section L11 of the former quadrant coil loop (i.e., the first quadrant coil loop L1), by using the centrally bridging line section C1. Further, the first section L21 thereof is also laterally bridged over the second section L22 thereof to the third section L23 thereof by using the laterally bridging line section S1, such that the third section L23 thereof is further directly coupled to the second section L42 of the diagonal quadrant coil loop (i.e., the fourth quadrant coil loop L4) through the central area. The second section L22 thereof is directly coupled to the third section L43 of the diagonal quadrant coil loop (i.e., the fourth quadrant coil loop L4) through the central area, and the second section L22 thereof is also directly coupled to the second section L22 of the former quadrant coil loop (i.e., the first quadrant coil loop L1) through the central area.

In the fourth quadrant coil loop L4, the first section L41 thereof is centrally bridged over the central area to the first section L31 of the former quadrant coil loop (i.e., the third quadrant coil loop L3), by using the centrally bridging line section C2. Further, the first section L41 thereof is also laterally bridged over the second section L42 thereof to the third section L43 thereof by using the laterally bridging line section S2, such that the third section L43 thereof is further directly coupled to the second section L22 of the diagonal quadrant coil loop (i.e., the second quadrant coil loop L2) through the central area. The second section L42 thereof is directly coupled to the third section L23 of the diagonal quadrant coil loop (i.e., the second quadrant coil loop L2) through the central area, and second section L42 thereof is also directly coupled to the second section L32 of the former quadrant coil loop (i.e., the third quadrant coil loop L3) through the central area.

In the third quadrant coil loop L3, the first section L31 thereof is centrally bridged over the central area to the first section L41 of the fourth quadrant coil loop L4, by using the centrally bridging line section C2. The first section L31 thereof is also centrally bridged over the central area to the third section L31 of the first quadrant coil loop L1, by using the centrally bridging line section C3. The second section L32 thereof is directly coupled to the second section L42 of the fourth quadrant coil loop L4 through the central area, and the second section L32 thereof is also laterally bridged over the first section L31 thereof to the third section L33 thereof by using the laterally bridging line section S3 such that the third section L33 thereof is further centrally bridged over the central area to the third section L13 of the first quadrant coil loop L1 by using the centrally bridging line section C4.

As a result, a total number of the centrally bridging line sections C1~C4 and the laterally bridging line sections S1~S3 configured to perform central bridging and lateral bridging is 7.

In the present embodiment, the first sections L11~L41, the second sections L12~L42 and the third sections L13~L43 of each of the first quadrant coil loop L1, the second quadrant coil loop L2, the third quadrant coil loop L3 and the fourth quadrant coil loop L4 form two outermost circle structures thereof. A current flowing direction of the first quadrant coil loop L1 and the third quadrant coil loop L3 is a first direction and the current flowing direction of the second quadrant coil loop L2 and the fourth quadrant coil loop L4 is a second direction. One of the first direction and the second direction is a clockwise direction and the other one of the first direction and the second direction is a counterclockwise direction.

Figure 2:
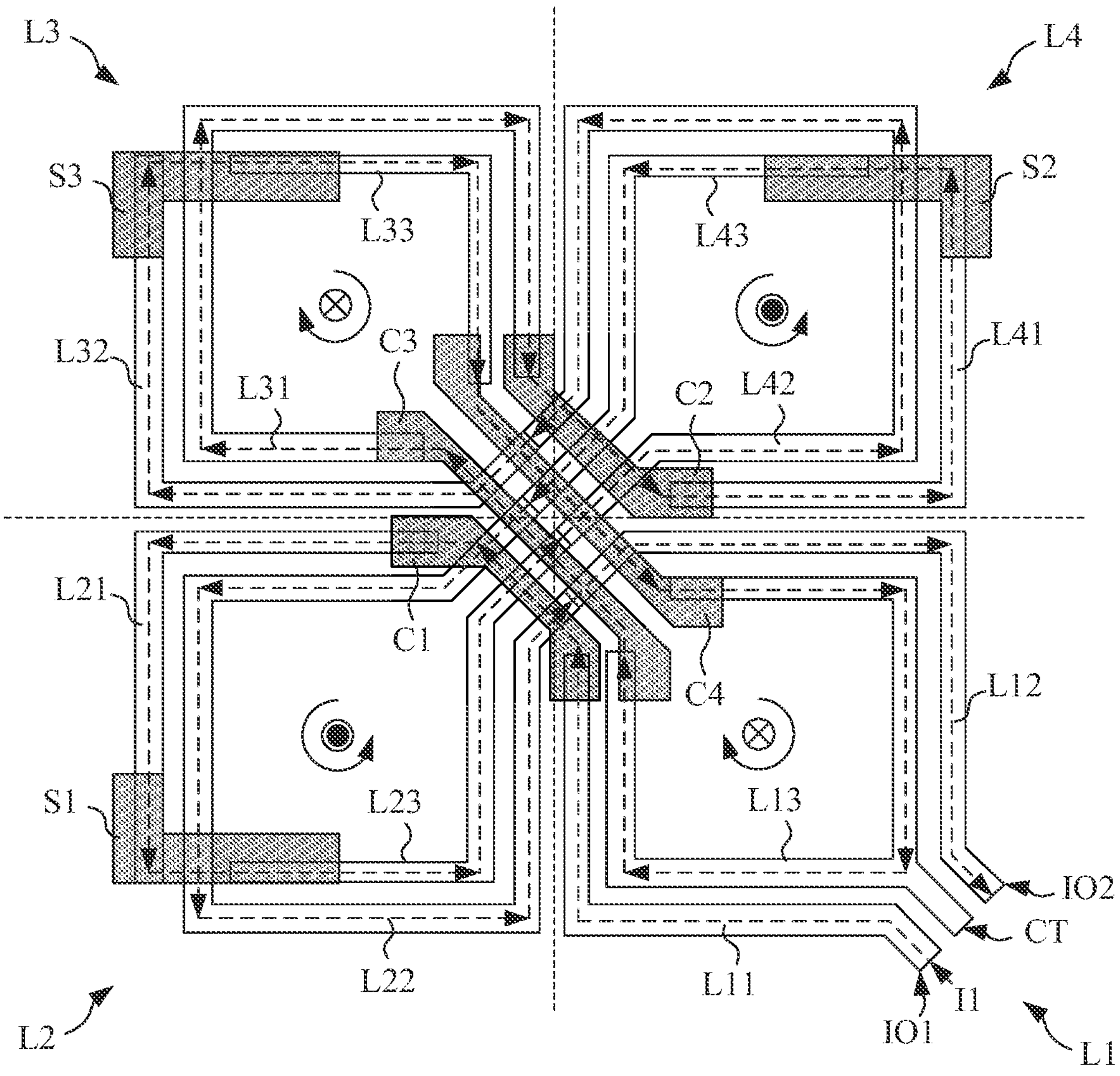
FIG. 2 illustrates a diagram of the current directions of the inductor apparatus under the condition that the first I/O terminal receives an input current according to an embodiment of the present invention.

Reference is now made to FIG. 2. FIG. 2 illustrates a diagram of the current directions of the inductor apparatus 100 under the condition that the first I/O terminal IO1 receives an input current according to an embodiment of the present invention. In order to clearly illustrate the current directions, the first sections L11~L41, the second sections L12~L42 and the third sections L13~L43 in FIG. 2 are all illustrated as white blocks in FIG. 3.

When the current I1 is inputted to the first I/O terminal IO1, the current I1 flows in the clockwise direction in the first quadrant coil loop L1 and the third quadrant coil loop L3 and flows in the counterclockwise direction in the second quadrant coil loop L2 and the fourth quadrant coil loop L4. In the end, the current I1 flows back to the first quadrant coil loop L1 and is outputted from the second I/O terminal IO2. Under such a condition, when the coil loops L1~L4 are formed on a plane of a paper, a direction of a magnetic field generated by the current I1 in the first quadrant coil loop L1 and the third quadrant coil loop L3 points inwards to the paper. A direction of a magnetic field generated by the current I1 in the second quadrant coil loop L2 and the fourth quadrant coil loop L4 points outwards to the paper.

In another embodiment, the current can also be inputted to the second I/O terminal IO2 such that the current flows in the counterclockwise direction in the first quadrant coil loop L1 and the third quadrant coil loop L3 and flows in the clockwise direction in the second quadrant coil loop L2 and the fourth quadrant coil loop L4. In the end, the current I1 flows back to the first quadrant coil loop L1 and is outputted from the first I/O terminal IO1. Under such a condition, when the coil loops L1~L4 are formed on a plane of a paper, a direction of a magnetic field generated by the current I1 in the first quadrant coil loop L1 and the third quadrant coil loop L3 points outwards to the paper. A direction of a magnetic field generated by the current I1 in the second quadrant coil loop L2 and the fourth quadrant coil loop L4 points inwards to the paper. Such a condition is not further illustrated herein.

Figure 3:
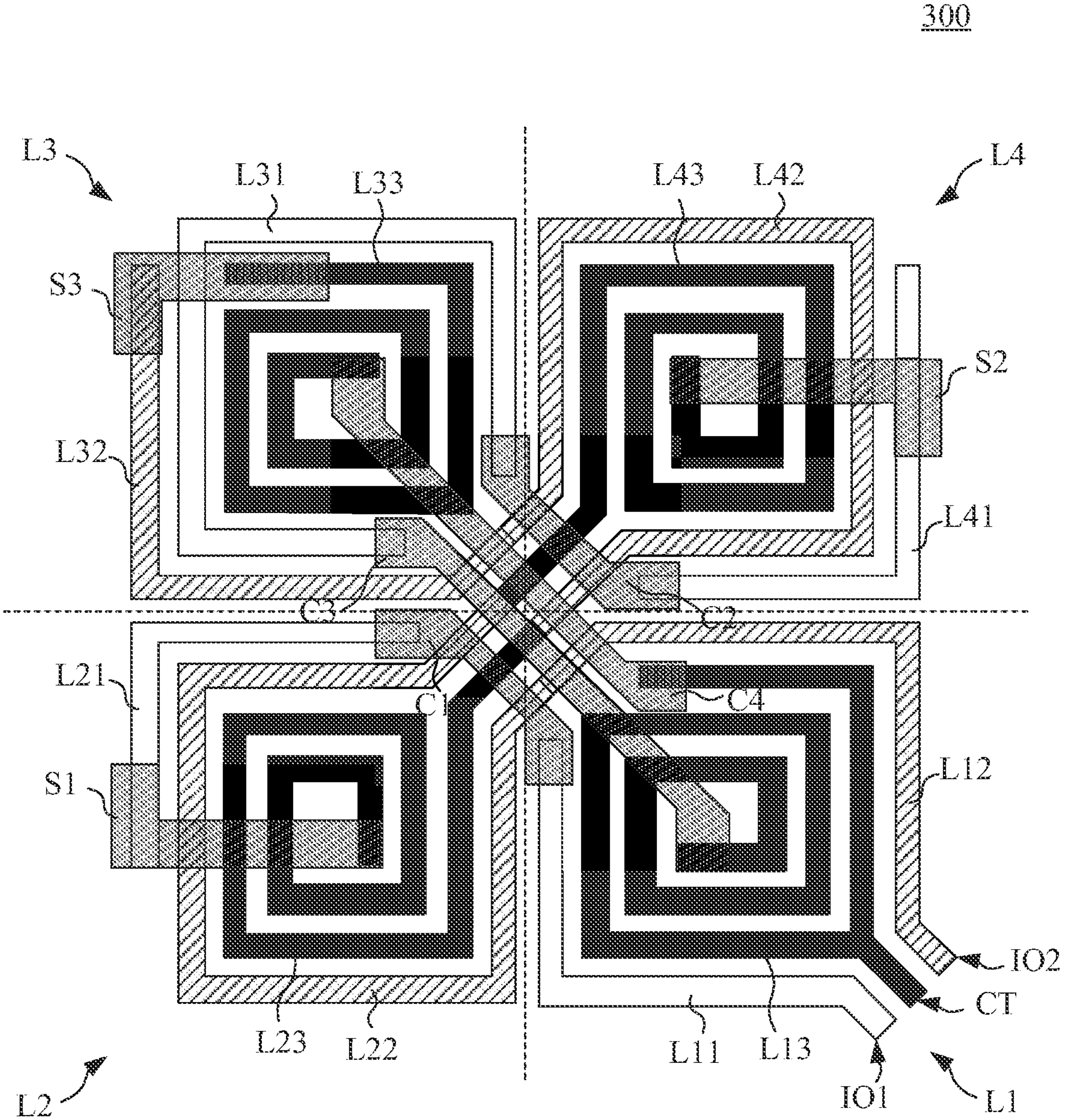
FIG. 3 illustrates a circuit diagram of an inductor apparatus according to another embodiment of the present invention.

Reference is now made to FIG. 3. FIG. 3 illustrates a diagram of an inductor apparatus 300 according to another embodiment of the present invention. Identical to the inductor apparatus 100 in FIG. 1, the inductor apparatus 300 includes the four coil loops L1~L4, the centrally bridging line sections C1~C4 and the laterally bridging line sections S1~S3. The configurations of the components in the inductor apparatus 30 are similar to those in FIG. 1. The identical parts are not described and only the difference is described herein.

In the present embodiment, in each of the coil loops L1~L4, the first sections L11~L41, the second sections L12~L42 and a part of the third sections L13~L43 form two outermost circle structures. The other part of the third sections L13~L43 form an inner circle structure.

More specifically, in the second quadrant coil loop L2, the third section L23 of the second quadrant coil loop L2 is laterally bridged to the first section L21 thereof from a central region of the second quadrant coil loop L2, winds to surround the central region to form at least one circle of an inner circle structure and a part of the two outermost circle structures to be further coupled to the second section L42 of the diagonal quadrant coil loop (i.e., the fourth quadrant coil loop L4).

In the fourth quadrant coil loop L4, the third section L43 of the fourth quadrant coil loop L4 is laterally bridged to the first section L41 thereof from a central region of the fourth quadrant coil loop L4, winds to surround the central region to form at least one circle of an inner circle structure and a part of the two outermost circle structures to be further coupled to the second section L22 of the diagonal quadrant coil loop (i.e., the second quadrant coil loop L2).

In the first quadrant coil loop L1, the third section L13 of the first quadrant coil loop L1 is centrally bridged over the central area to the first section L31 of the third quadrant coil loop L3 from a central region of the first quadrant coil loop L1, winds to surround the central region to form at least one circle of an inner circle structure and a part of the two outermost circle structures to be further centrally bridged over the central area to the third section L33 of the third quadrant coil loop L3.

In the third quadrant coil loop L3, the third section L33 of the third quadrant coil loop L3 is centrally bridged over the central area to the third section L13 of the first quadrant coil loop L1 from a central region of the third quadrant coil loop L31, winds to surround the central region to form at least one circle of an inner circle structure and a part of the two outermost circle structures to be further laterally bridged to the second section L32 of the third quadrant coil loop L3.

As illustrated in FIG. 3, the inner circle structure of each of the coil loops L1~L4 includes 2 circles. As a result, each of the coil loops in the present embodiment is a four-circle structure.

It is appreciated that the two-circle inner circle structure formed by the third section is merely an example. In different embodiments, the third section may form an inner circle structure with more number of circles depending on requirements and under the condition that the space of the central region is enough, such that each of the coil loops has a structure of more number of circles. However, besides the two outermost circles, the other circles are formed by the third section. As a result, no matter how many total number of circles in each coil loops, the configuration of the centrally bridging line sections C1~C4 and the laterally bridging line sections S1~S3 is the same such that the total number thereof is fixed to be 7 regardless of the total number of the circles.

In an embodiment, due to the material of different sections, the impedance of each of the centrally bridging line sections C1~C4 and the laterally bridging line sections S1~S3 is larger than the impedance of each of the first sections L11~L41, the second sections L12~L42 and the third sections L13~L43 of each of coil loops L1~L4. For example, the material of each of the centrally bridging line sections C1~C4 and the laterally bridging line sections S1~S3 can be such as, but not limited to alumni. The material of each of the first sections L11~L41, the second sections L12~L42 and the third sections L13~L43 of each of coil loops L1~L4 can be ultra thick metal (UTM).

In some approaches, the total number of the bridging line sections increases when the number of the circles of the coil loops increases. The complexity of the wiring and the impedance both increase. However, in the present invention, the number of the centrally bridging line sections and the laterally bridging line sections does not change along with the increase of the number of the circles. Not only the complexity of the wiring of the inductor apparatus 100 decreases, the increase of the impedance can also be prevented. The design of the inductor coil can be simplified and the efficiency thereof can be improved.

Figure 4:
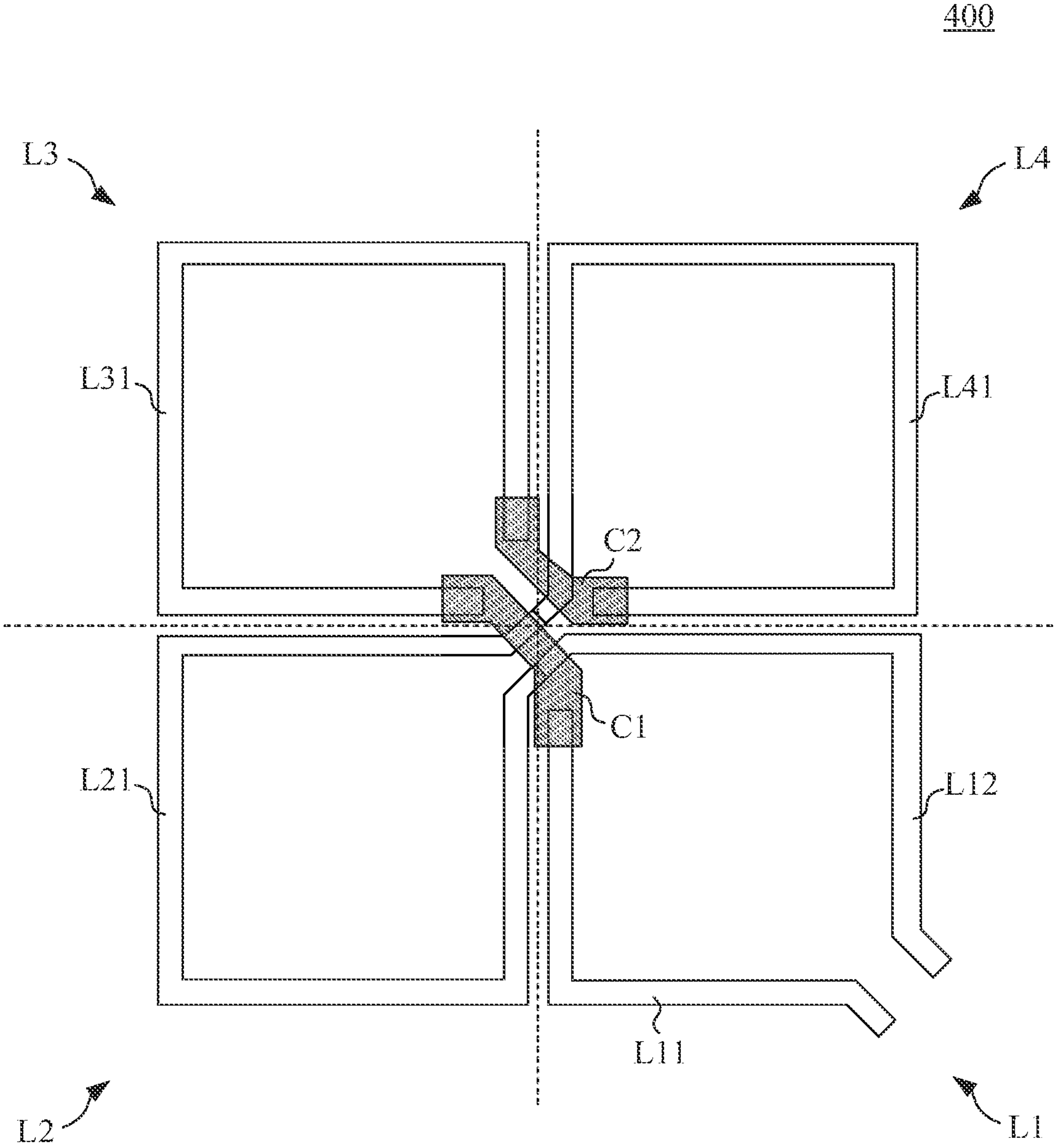
FIG. 4 illustrates a circuit diagram of an inductor apparatus according to yet another embodiment of the present invention.

Reference is now made to FIG. 4. FIG. 4 illustrates a diagram of an inductor apparatus 400 according to yet another embodiment of the present invention. The inductor apparatus 400 includes four coil loop L1~L4 and the centrally bridging line sections C1~C2.

The four coil loops L1~L4 are arranged in an order of a clockwise manner and includes the first quadrant coil loop L1, the second quadrant coil loop L2, the third quadrant coil loop L3 and the fourth quadrant coil loop L4. According to the arrangement relation of any one of the quadrant coil loop with the other three quadrant coil loops, each of the quadrant coil loops has a former quadrant coil loop, a latter quadrant coil loop and a diagonal quadrant coil loop disposed nearby.

Take the first quadrant coil loop L1 as an example, the former quadrant coil loop is the fourth quadrant coil loop L4, the latter quadrant coil loop is the second quadrant coil loop L2 and the diagonal quadrant coil loop is the third quadrant coil loop L3. Each of the rest of the three quadrant coil loops has an identical relation with other quadrant coil loops and is not further described herein.

The first quadrant coil loop L1 includes the first section L11 and the second section L12. The first section L11 thereof is directly coupled to the first I/O terminal IO1, and the second section L12 thereof is directly coupled to the second I/O terminal IO2.

The second quadrant coil loop L2 includes the first section L21 directly coupled to the second section L12 of the first quadrant coil loop L1 through the central area of the four coil loops L1~L4. The third quadrant coil loop L3 includes the first section L31 centrally bridged over the central area to the first section L11 of the first quadrant coil loop L1 by using the centrally bridging line sections C1. The fourth quadrant coil loop L4 includes the first section L41 directly coupled to the first section L21 of the second quadrant coil loop L2 through central area and centrally bridged over the central area to the first section L31 of the third quadrant coil loop L3 by using the centrally bridging line sections C2.

As a result, as illustrated in FIG. 4, in the present embodiment, each of the first quadrant coil loop L1, the second quadrant coil loop L2, the third quadrant coil loop L3 and the fourth quadrant coil loop L4 includes a one-circle structure. As a result, the laterally bridging line sections are not necessary to be used in the inductor apparatus 400.

In summary, the inductor apparatus of the present invention can keep the number of the centrally bridging line sections and the laterally bridging line sections unchanged, by using the disposition method of the first section, the second section and the third section of each of the quadrant coil loops, without being affected by the number of the circles of each of the quadrant coil loops. The design of the inductor coil can be simplified and the efficiency thereof can be improved.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An inductor apparatus comprising:

four coil loops arranged in an order of a clockwise manner and comprising:

a first quadrant coil loop comprising a first section, a second section and a third section, wherein the first section thereof is directly coupled to a first I/O terminal, and the second section thereof is directly coupled to a second I/O terminal;

a second quadrant coil loop and a fourth quadrant coil loop each comprising a first section, a second section and a third section, wherein the first section thereof is centrally bridged over a central area of the four coil loops to the first section of a former quadrant coil loop, and the first section thereof is also laterally bridged over the second section thereof to the third section thereof such that the third section thereof is further directly coupled to the second section of a diagonal quadrant coil loop through the central area, and the second section thereof is directly coupled to the third section of the diagonal quadrant coil loop, and second section thereof is also directly coupled to the second section of the former quadrant coil loop through the central area; and a third quadrant coil loop comprising a first section, a second section and a third section, wherein the first section thereof is centrally bridged over the central area to the first section of the fourth quadrant coil loop and the first section thereof is also centrally bridged over the central area to the third section of the first quadrant coil loop, the second section thereof is directly coupled to the second section of the fourth quadrant coil loop through the central area and the second section thereof is also laterally bridged over the first section thereof to the third section thereof such that the third section thereof is further centrally bridged over the central area to the third section of the first quadrant coil loop; and a plurality of centrally bridging line sections and a plurality of laterally bridging line sections configured to perform central bridging and lateral bridging.

2. The inductor apparatus of claim 1, wherein a total number of the centrally bridging line sections and the laterally bridging line sections is 7.

3. The inductor apparatus of claim 1, wherein the first section, the second section and at least part of the third section of each of the first quadrant coil loop, the second quadrant coil loop, the third quadrant coil loop and the fourth quadrant coil loop form two outermost circle structures.

4. The inductor apparatus of claim 3, wherein the third section of each of the second quadrant coil loop and fourth quadrant coil loop is laterally bridged to the first section thereof from a central region of each of the second quadrant coil loop and the fourth quadrant coil loop, winds to surround the central region to form at least one circle of an inner circle structure and a part of the two outermost circle structures to be further directly coupled to the second section of the diagonal quadrant coil loop.

5. The inductor apparatus of claim 3, wherein the third section of the first quadrant coil loop is centrally bridged over the central area to the first section of the third quadrant coil loop from a central region of the first quadrant coil loop, winds to surround the central region to form at least one circle of an inner circle structure and a part of the two outermost circle structures to be further centrally bridged over the central area to the third section of the third quadrant coil loop;

the third section of the third quadrant coil loop is centrally bridged over the central area to the third section of the first quadrant coil loop from a central region of the third quadrant coil loop, winds to surround the central region to form at least one circle of an inner circle structure and a part of the two outermost circle structures to be further laterally bridged to the second section of the third quadrant coil loop.

6. The inductor apparatus of claim 1, wherein the third section of the first quadrant coil loop comprises a central tap.

7. The inductor apparatus of claim 1, wherein a current flowing direction of the first quadrant coil loop and the third quadrant coil loop is a first direction and the current flowing direction of the second quadrant coil loop and the fourth quadrant coil loop is a second direction, wherein one of the first direction and the second direction is a clockwise direction and the other one of the first direction and the second direction is a counterclockwise direction.

8. The inductor apparatus of claim 7, wherein a magnetic field direction of each of the first quadrant coil loop, the second quadrant coil loop, the third quadrant coil loop and the fourth quadrant coil loop is determined by the current flowing direction thereof.

9. The inductor apparatus of claim 1, wherein an impedance of each of the centrally bridging line sections and the laterally bridging line sections is larger than the impedance of the first section, the second section and the third section of each of the first quadrant coil loop, the second quadrant coil loop, the third quadrant coil loop and the fourth quadrant coil loop.

10. An inductor apparatus comprising:

four coil loops arranged in an order of a clockwise manner and comprising:

a first quadrant coil loop comprising a first section and a second section, wherein the first section is directly coupled to a first I/O terminal and the second section is directly coupled to a second I/O terminal;

a second quadrant coil loop comprising a first section directly coupled to the second section of the first quadrant coil loop through a central area of the four coil loops;

a third quadrant coil loop comprising a first section centrally bridged over the central area to the first section of the first quadrant coil loop; and a fourth quadrant coil loop comprising a first section directly coupled to the first section of the second quadrant coil loop through central area and centrally bridged over the central area to the first section of the third quadrant coil loop; and a plurality of centrally bridging line sections configured to perform central coupling.

* * * * *